United States Patent [19]

Endo

[11] 4,152,612
[45] May 1, 1979

[54] ELECTRIC MOTOR WITH OPERATION-INDICATING MEANS

[75] Inventor: Yukio Endo, Tokyo, Japan
[73] Assignee: Kabushiki Kaisha Seikosha, Japan
[21] Appl. No.: 767,050
[22] Filed: Feb. 9, 1977
[30] Foreign Application Priority Data

Feb. 10, 1976 [JP] Japan ............................ 51-14617[U]

[51] Int. Cl.² ............................................ H02K 5/00
[52] U.S. Cl. ........................................ 310/83; 310/89; 35/13; 74/421 A
[58] Field of Search ............. 310/40 MM, 73, 89, 162, 310/163, 156, 43, 90, 83; 58/23 D, 125 C, 126 E, 127, 59; 35/10, 39, 13, 51; 74/421 A

[56] References Cited

U.S. PATENT DOCUMENTS

| 2,209,362 | 7/1940 | Sutherland | 310/89 UX |
|---|---|---|---|
| 2,269,035 | 1/1942 | Neal | 35/13 |
| 2,272,242 | 2/1942 | Frischknecht | 58/125 C |
| 3,240,965 | 3/1966 | Casey | 310/156 |
| 3,256,453 | 6/1966 | Haydon | 310/156 |
| 3,400,285 | 9/1968 | Buck | 310/89 |
| 3,469,131 | 9/1969 | Stellwagen | 310/162 |
| 3,482,126 | 12/1969 | Bradley | 310/156 |
| 3,508,350 | 4/1967 | Genin | 35/39 |
| 3,662,198 | 5/1972 | Adams | 310/89 |
| 3,676,725 | 7/1972 | Wiser | 310/89 |
| 3,855,490 | 12/1974 | Sidell | 310/162 |
| 3,909,646 | 9/1975 | Haydon | 310/156 |
| 3,967,147 | 6/1976 | Preiser | 310/156 |

*Primary Examiner*—R. Skudy
*Attorney, Agent, or Firm*—Robert E. Burns; Emmanuel J. Lobato; Bruce L. Adams

[57] ABSTRACT

A small electric motor, for example for driving a clock comprises a capsule within which are provided a stator, a rotor and a deceleration gear train. One wheel in the deceleration gear train bears a pattern on its periphery for indicating the state of operation of the motor. The capsule is either transparent or is provided with a window for observing the wheel bearing such pattern.

1 Claim, 4 Drawing Figures

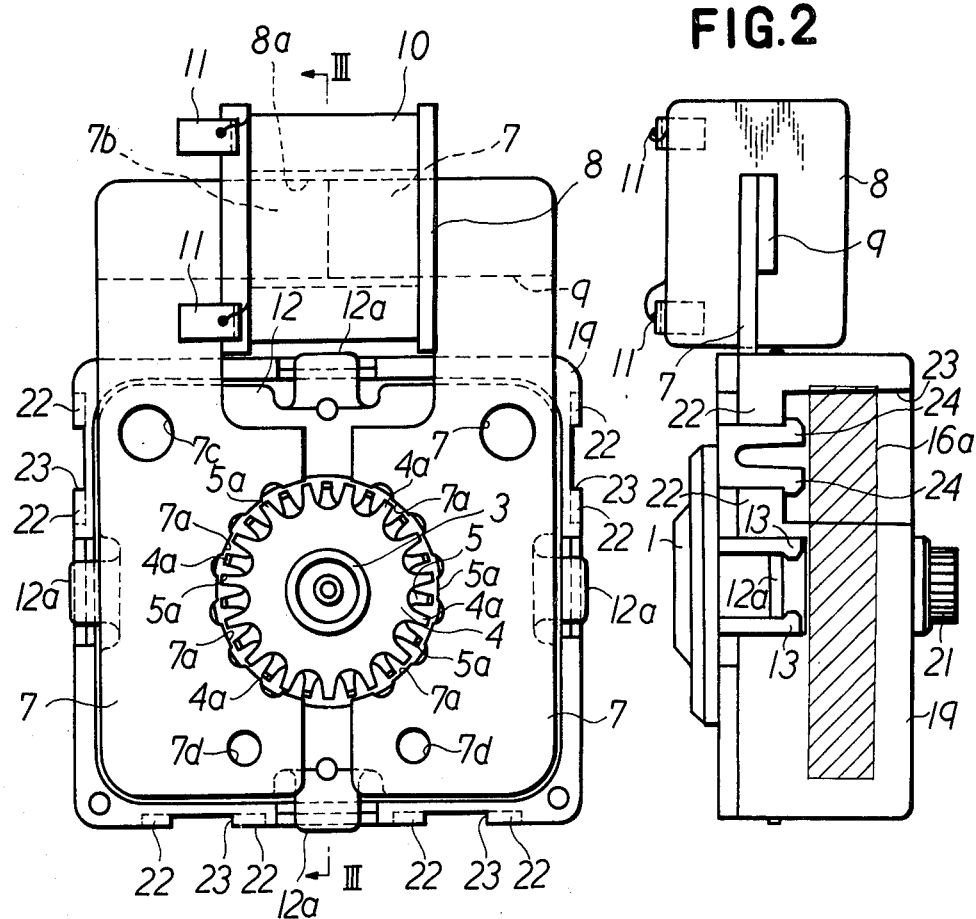

ELECTRIC MOTOR WITH OPERATION-INDICATING MEANS

FIELD OF INVENTION

The present invention relates to electric motors and particularly to small electric motors used for clocks and the like.

BACKGROUND OF INVENTION

In a conventional hysteresis motor of the external rotor type the state of operation of the motor can be indicated by a pattern provided on the outer periphery of the rotor. This conventional device has the defect that it is hard to observe the pattern since the rotor revolves too fast.

SUMMARY OF INVENTION

It is an object of the present invention to overcome the defects of conventional motors of the kind used for electric clocks. In accordance with the invention, the motor comprises a capsule within which there is provided a stator, a rotor magnetically coupled with the stator and a deceleration gear train driven by the rotor. The deceleration gear train includes a wheel having on its periphery a pattern for indicating the state of operation of the motor. The capsule is transparent or is provided with a window through which the pattern on the periphery of the aforementioned wheel can be observed. As this wheel runs at a lower speed than the rotor, the state of operation of the motor can be readily observed.

BRIEF DESCRIPTION OF DRAWINGS

The above object and other objects and the characteristic features of the present invention will become evident and will be more readily understood from the following description and accompanying drawings in which:

FIG. 1 is an elevational view of an embodiment of the present invention with an upper capsule portion removed to show the interior, FIG. 2 is a right-side view of the embodiment shown in FIG. 1.

DESCRIPTION OF PREFERRED EMBODIMENTS

Figure 3:
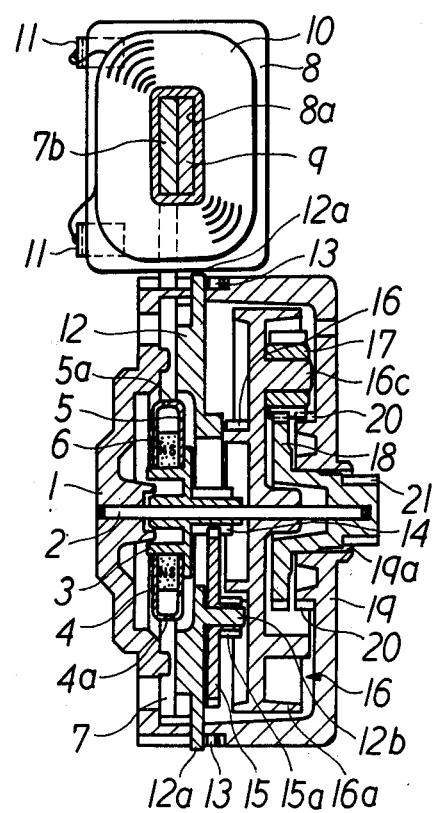
FIG. 3 is a sectional view along the line III—III in FIG. 1

As shown by way of example in the drawings, a motor in accordance with the invention comprises a lower capsule portion 1 at the center of which a rotor shaft 2 is inserted and fixed. A rotor washer 3 is rotatably supported by the rotor shaft 2. Rotor magentic plates 4 and 5 sandwich a rotor magnet 6 and are secured to the rotor washer 3 thereby forming a rotor. The rotor magnetic plates 4 and 5 are respectifully provided at their peripheries with curved magnetic poles namely, N poles 4a and S poles 5a. As seen in FIG. 1 the N poles 4a and S poles 5a are alternately arranged. A pair of stator plates 7 are made of high magnetic permeability material and are provided with stator poles 7a arranged in a circle surrounding the rotor so as to be coupled magnetically with the magnetic poles 4a and 5a of the rotor. Each stator plate 7 is provided with an integral yoke 7b. The two stator plates 7 are arranged facing one another with the ends of the yoke portions 7b contacting one another in the hole of a bobbin 8. A supporting plate 9 is laid on the yoke portion 7b and connects them by welding or the like. A magnetizing coil 10 is provided around the bobbin 8 and its ends are respectively connected to lead terminals. 11. The stator plates 7 are secured to the lower capsule portion 1 by holes 7c and 7d in the plates engaging with projections (not shown) of the lower capsule portion.

The rotor and the stator plates 7 are sandwiched between the end of the lower capsule portion 1 and a stationary plate 12 which is fixed to the lower portion 1 by the following elastic coupling means. The stationary plate 12 is formed at its periphery with four projecting tongues 12a, whereas the lower capsule portion 1 is provided with four pairs of legs 13 arranged at positions corresponding to the tongues. Each tongue 12a of the stationary plate 12 is snap-fitted between the legs of the corresponding pair of legs 13 thereby firmly but resiliently connecting the stationary plate 12 with the lower capsule portion 1.

A rotor pinion 14 is formed integrally with the rotor washer 3. The rotor pinion 14 engages with a transmission wheel 15 which is rotatably supported by a stub shaft 12b projecting from the stationary plate 12. An operation-indicating wheel 16 rotatably supported by the rotor shaft 2 has on its left side as viewed in FIG. 3, a gear 16b which meshes with a transmission pinion 15a formed on the transmission wheel 15. The operation-indicating wheel 16 bears a pattern of alternately visually contrasting portions on its cylindrical circumferential surface 16a shown in the form of alternating dark and light diagonal lines.

The operation-indicating wheel 16 has on its right-hand side, as viewed in FIG. 3 a projecting stub shaft 16c on which an idle wheel 17 is rotatable. An output gear wheel 18 is rotatably supported by the rotor shaft 2 and meshes with the idle wheel 17. An upper capsule portion 19 is provided a hole 19a by which the output wheel 18 is also supported. The upper capsule portion 19 is also provided on its inner inner face with an integral stationary gear wheel 20 concentric with the hole 19a. The idle wheel 17 also engages with the stationary gear wheel 20 to form a differential gear mechanism. An output pinion 21 formed integrally with the output wheel 18 projects outside the upper capsule portion 19 as seen in FIGS. 2 and 3.

The upper capsule portion 19 and lower capsule portion 1 are engaged with one another by the following elastic coupling means. Four pairs of engaging jaws 22 are formed at the periphery of the upper capsule portion 19. Each pair of jaws 22 forms a concave portion 23. The lower capsule portion 1 is formed with four pairs of hook-like legs 24 which are snap-fitted in the space between the jaws of a corresponding pair of jaws 22 of the upper capsule portion 19 as seen in FIG. 2. The capsule is formed of plastic material having sufficient resiliency to permit the snap-fitting as described.

In operation of the motor the leads of the magnetizing coil 10 are connected with a commercial alternating current power source whereupon the rotor is revolved at a predetermined speed. The rotational force of the rotor is transmitted to the output wheel 18 through the rotor pinion 14, the transmission wheel 15, the operation-indicating wheel 16 and the differential gear mechanism comprising the idle wheel 17, output wheel 18 and stationary gear 20. The upper capsule 19 is made of transparent material in the embodiment illsutrated in FIGS. 1-3, so that the pattern on the periphery of the operation-indicating wheel 16 can be observed from the outside. Since the operation-indicating wheel 16 rotates at a speed considerably slower than the speed of rotation of the rotor, the indicating pattern can be easily observed.

Figure 4:
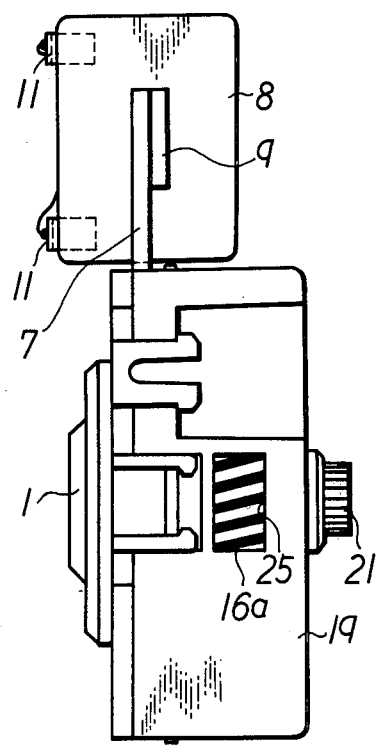
FIG. 4 is a side view of another embodiment.

In case the upper capsule portion 19 is made of opaque material, as illustrated in FIG. 4, a window 25 is provided at a position facing the operating-indicating wheel 16 so that the pattern on the periphery of the operation-indicating wheel can be observed from the outside through the window 15.

While preferred embodiments of the invention have been illustrated in the drawings and are herein particularly described, it will be understood that many modifications can be made and that the invention is hence in no way limited to the illustrated embodiments.

What is claimed is

1. An electric motor comprising a capsule, a stator fixed in said capsule, a rotor rotatably supported in said capsule and revolvably magnetically coupled to said stator, a speed-reducing gear train in said capsule and driven by said rotor, said reducing gear train including an operation-indicating wheel rotating at a lower speed than said rotor and having at its periphery visual indicating means comprising a pattern of alternating visually contrasting portions, said capsule having a transparent portion positioned for observing said indicating means therethrough to determine the state of operation of said motor, said speed-reducing gear train comprising a first pinion on said rotor, a transmission gear wheel driven by said first pinion, a second pinion on said transmission gear wheel meshing with a gear on said operation-indicating wheel, an output gear wheel and an adjacent stationary gear of like diameter both coaxial with said rotor, and an idle wheel rotatable on a stub shaft projecting from said operation-indicating wheel and meshing with both said output gear wheel and said stationary gear wheel.

* * * * *